United States Patent [19]

Robb

[11] Patent Number: 4,913,535

[45] Date of Patent: Apr. 3, 1990

[54] APOCHROMATIC LENS SYSTEMS

[75] Inventor: Paul N. Robb, Sunnyvale, Calif.

[73] Assignee: Lockheed Missiles & Space Company, Inc., Sunnyvale, Calif.

[21] Appl. No.: 345,793

[22] Filed: May 1, 1989

[51] Int. Cl.[4] .............................................. G02B 3/12
[52] U.S. Cl. .................................................... 350/418
[58] Field of Search ............................... 350/418, 419

[56] References Cited

FOREIGN PATENT DOCUMENTS 0017832 of 1899 United Kingdom ................ 350/418
0006194 of 1901 United Kingdom ................ 350/418

Primary Examiner—Bruce Y. Arnold
Assistant Examiner—Rebecca D. Gass
Attorney, Agent, or Firm—John J. Morrissey

[57] ABSTRACT

An apochromatic lens system consisting of three identical glass lens elements and a liquid lens element is disclosed. The glass lens elements are made from an inexpensive and readily available optical glass, and the liquid lens element is made from a commercially available immersion oil. The lens elements coact to focus optical radiation passing through the system onto a focal surface with a change in focus of less than one-quarter wavelength over a wavelength range from 0.48 micron to 0.72 micron.

6 Claims, 9 Drawing Sheets

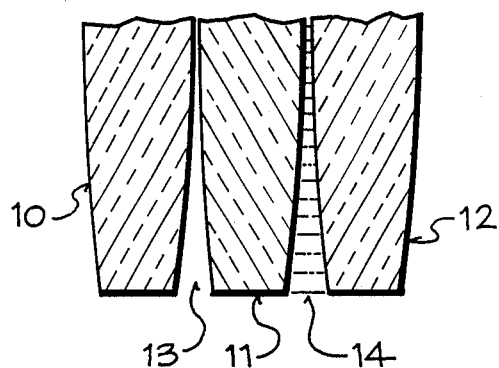
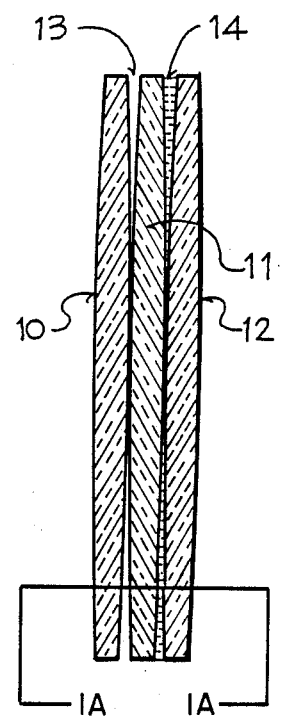
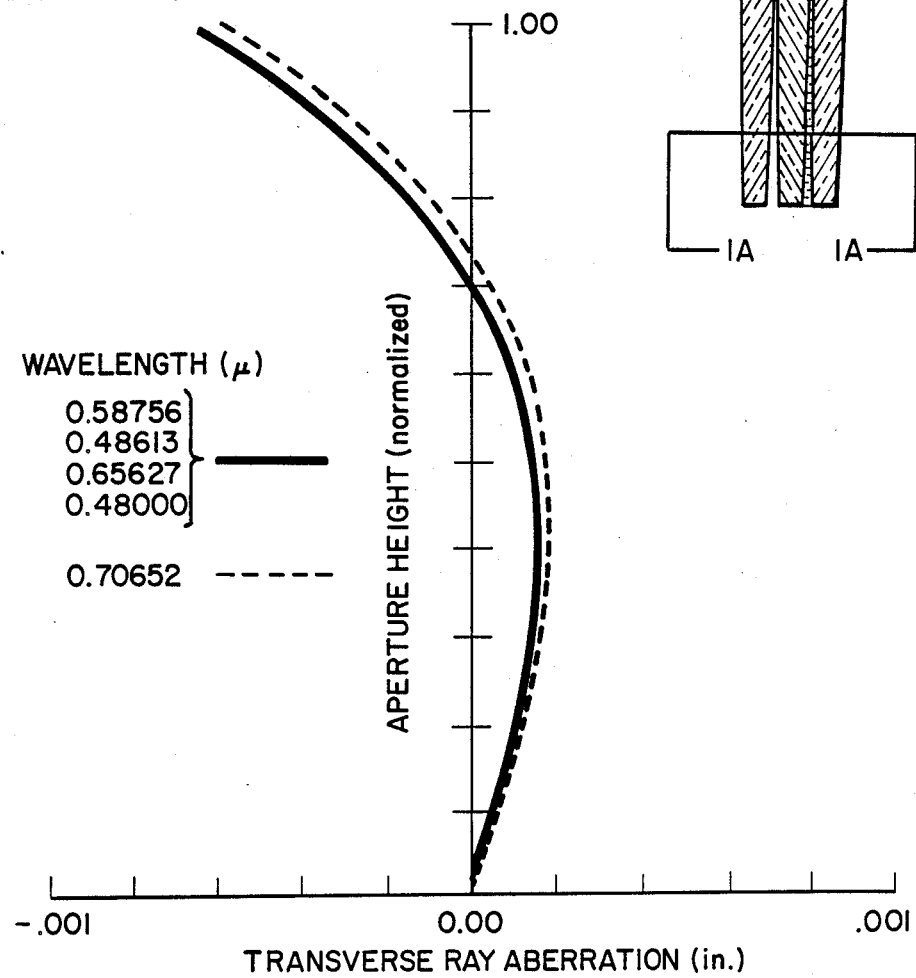

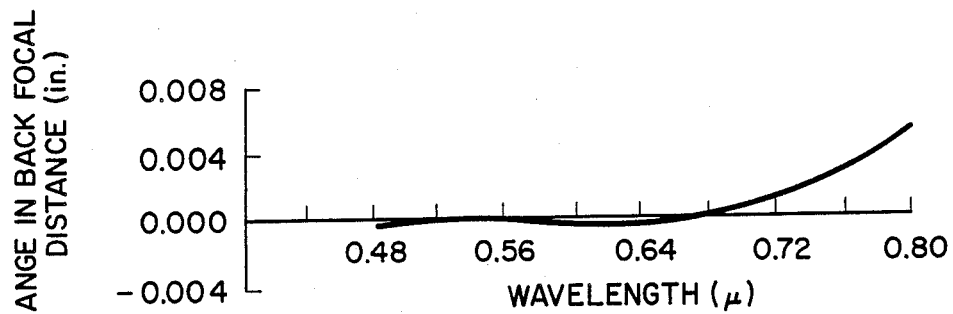
FIG_3
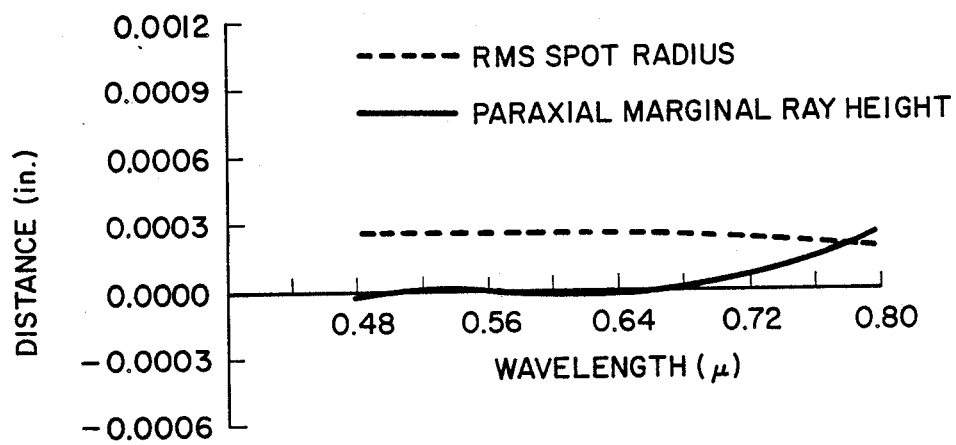
FIG_4

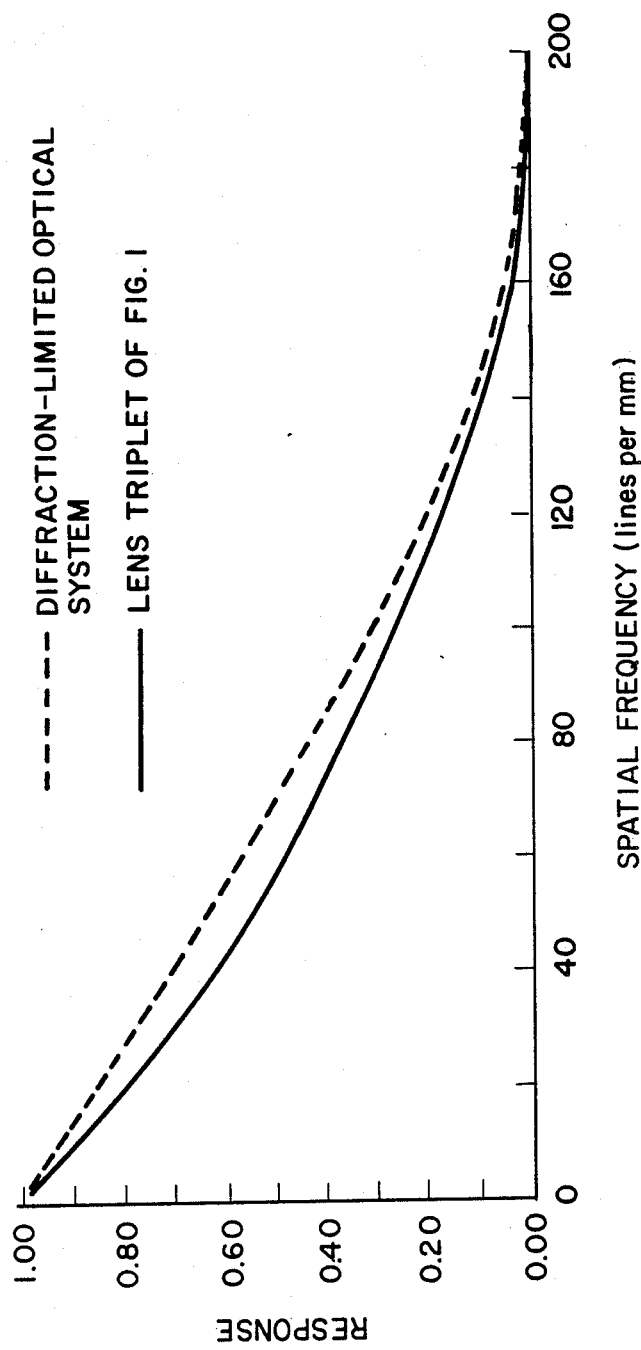

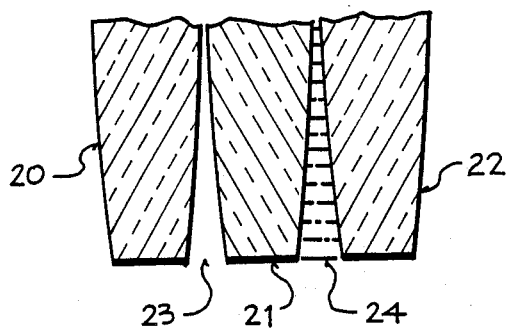
FIG_6A
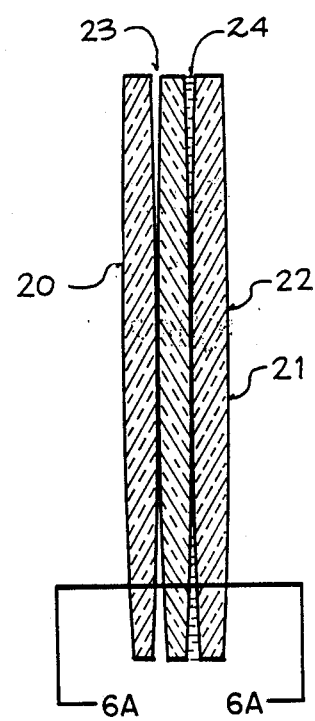
FIG_6
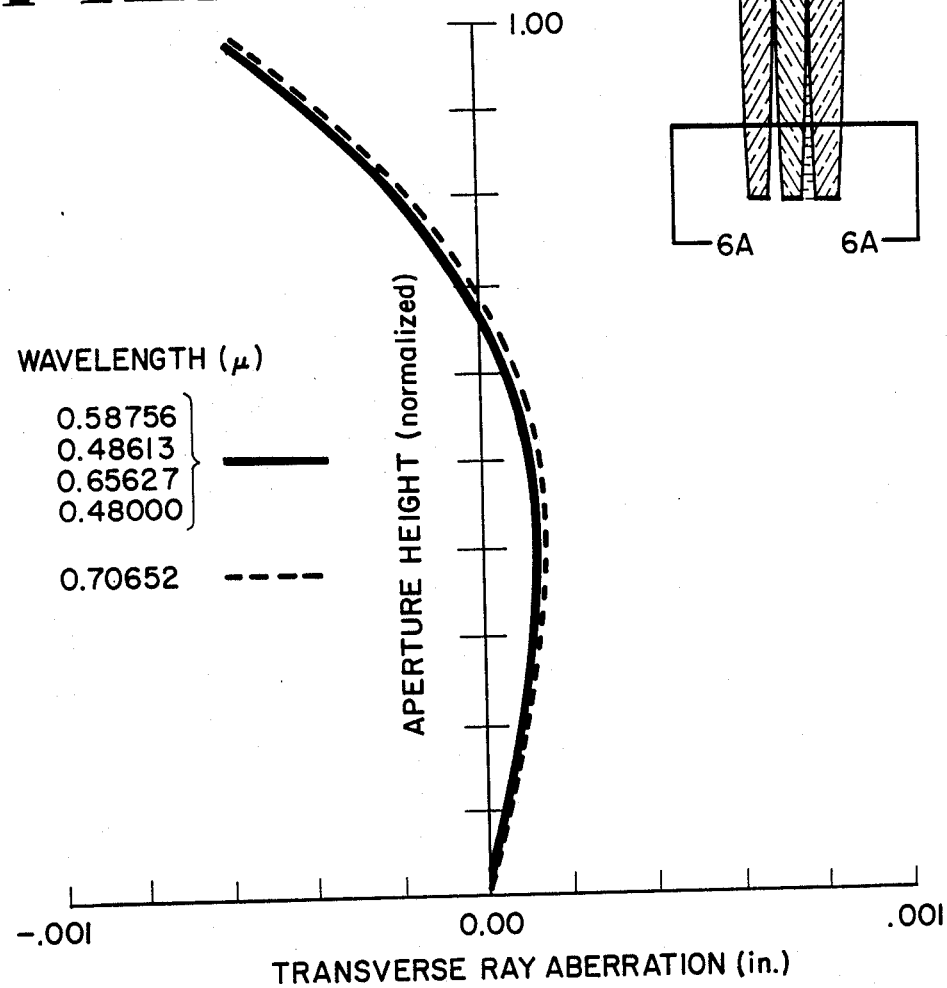
FIG_7

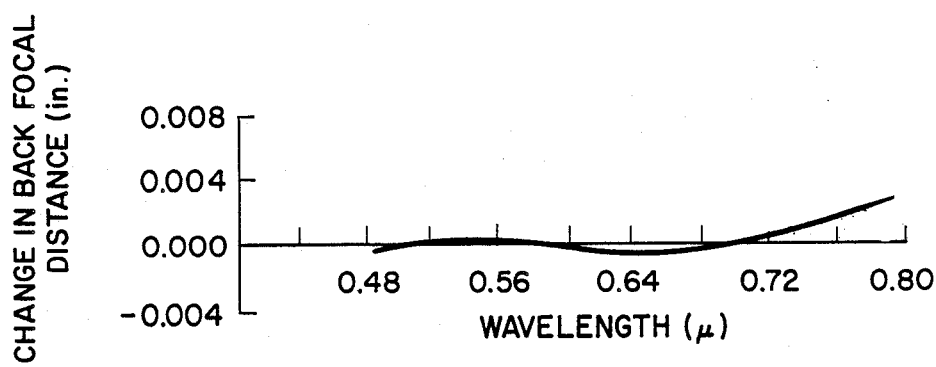
FIG_8
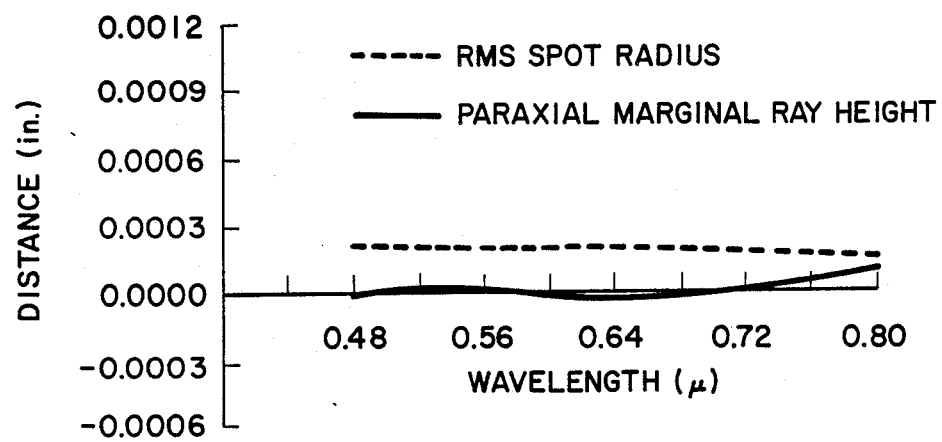
FIG_9

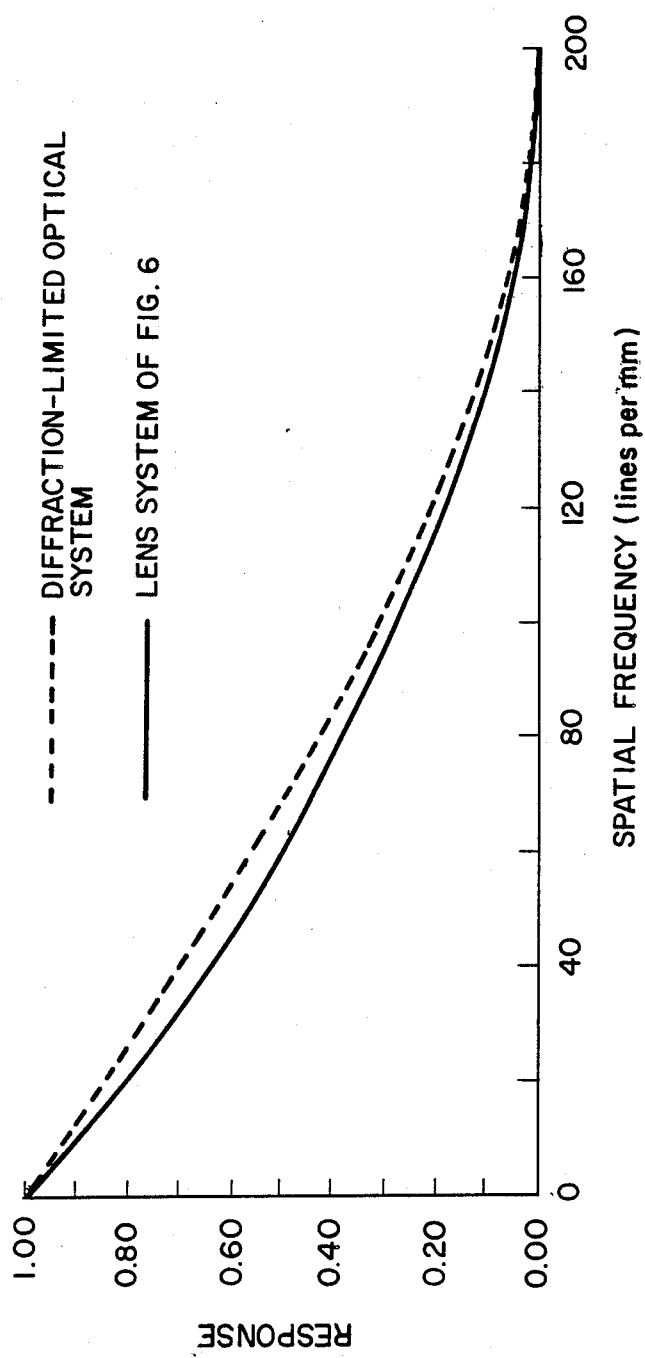
FIG_10

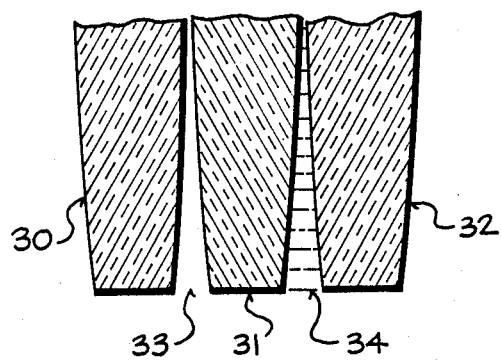
FIG_11A
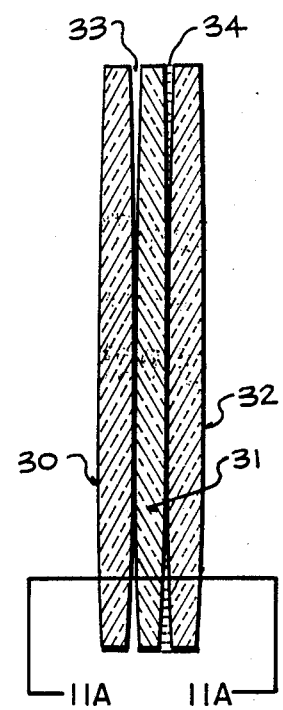
FIG_11
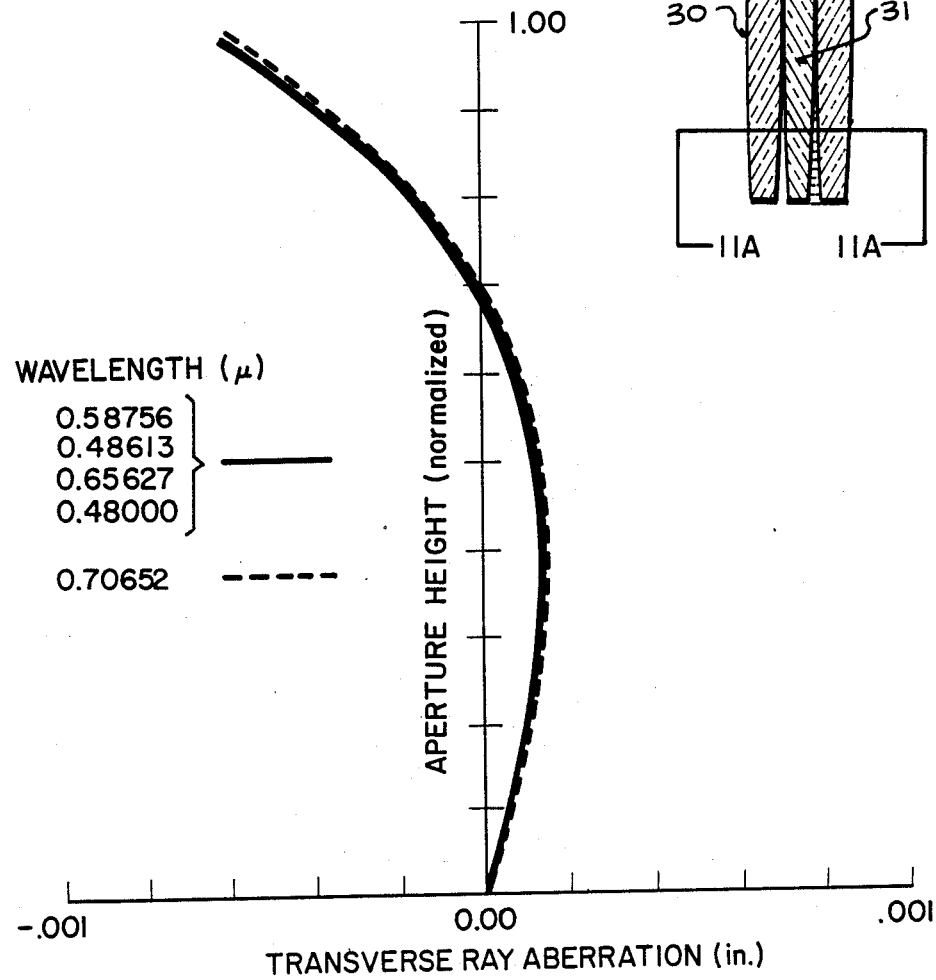
FIG_12

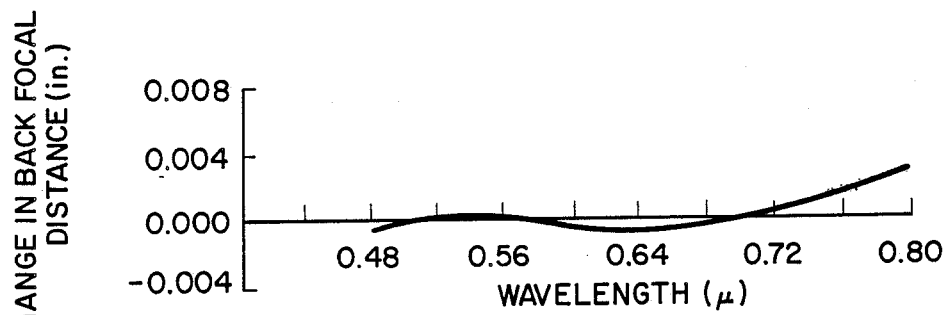
FIG_13
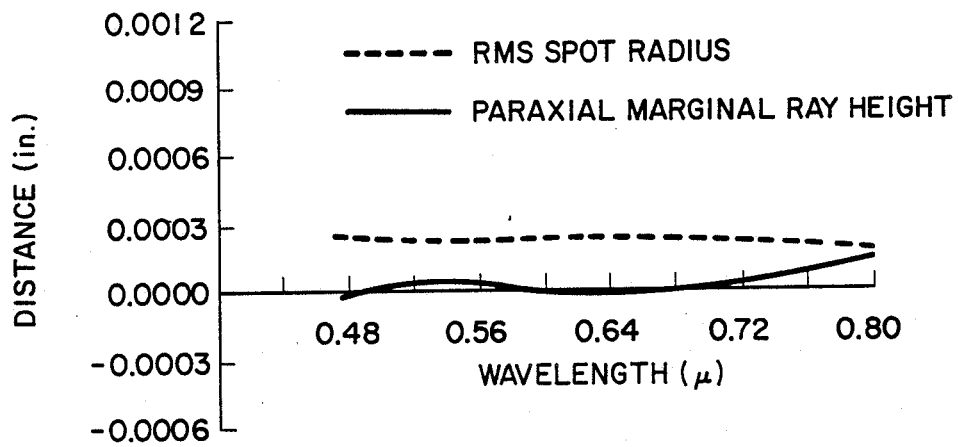
FIG_14

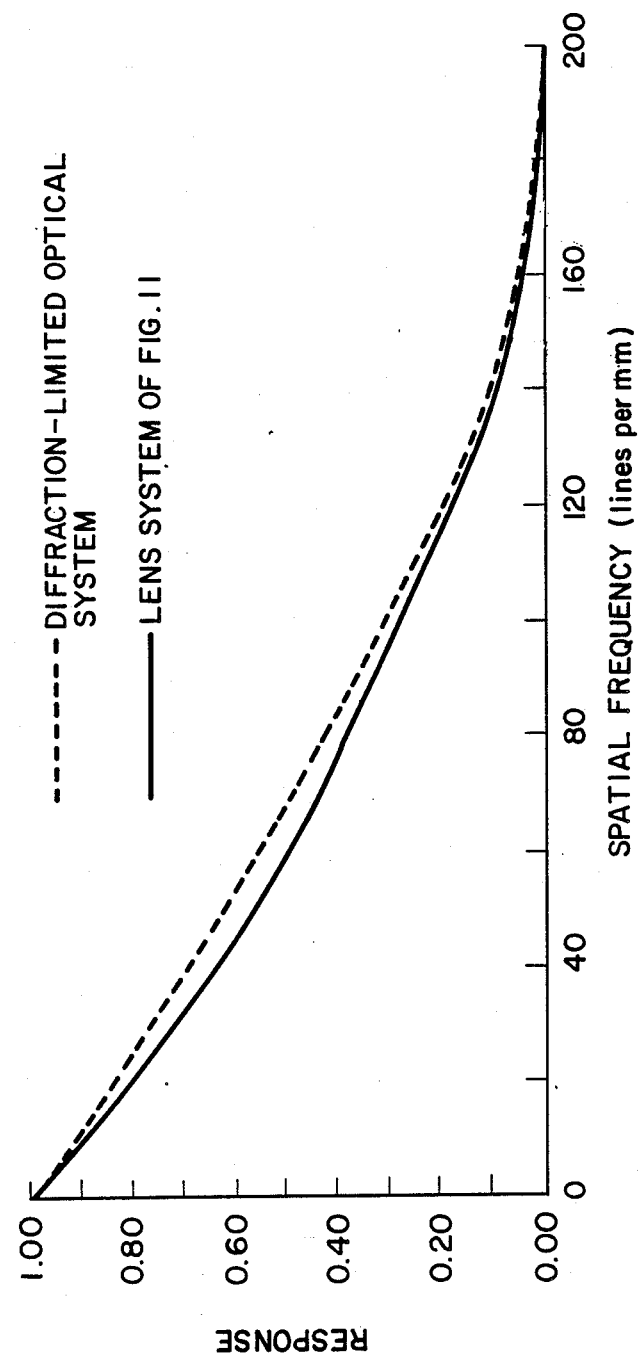
FIG_15

APOCHROMATIC LENS SYSTEMS

TECHNICAL FIELD

This invention relates generally to apochromatic lens systems, and more particularly to a technique for designing an apochromatic lens system of optimal performance using only a single type of optical glass and a single optical liquid (both of which are inexpensive and readily available) for the lens elements of the system.

BACKGROUND OF THE INVENTION

In co-pending U.S. patent application Ser. No. 419,705 filed on Sept. 20, 1982, a technique was disclosed that enables an optical designer to select compatible optical materials for the refractive elements of an optical system that is to be color-corrected at a specified number of wavelengths. A technique disclosed in co-pending U.S. patent application Ser. No. 260,106 filed on Oct. 20, 1988 enables the designer of a lens system that is to be color-corrected at a specified number of wavelengths to include one or more liquid lens elements among the lens elements of the system.

In co-pending U.S. patent application Ser. No. 282,665 filed on Dec. 12, 1988, examples were disclosed of apochromatic lens triplets of a type in which a liquid lens element is contained between two geometrically identical glass lens elements facing in opposite directions.

SUMMARY OF THE INVENTION

It is an object of the present invention to provide a technique for designing an apochromatic lens system of optimal performance having a change in focus of less than one-quarter wavelength over the visible spectrum using only a single type of optical glass and a single optical liquid, both of which are inexpensive, readily available and without significant difficulties in terms of manufacturability.

A lens system according to the present invention comprises three geometrically identical lens elements made of a commercially available optical glass (e.g., Schott K5 glass, or Schott SK10 glass, or Schott BAK1 glass), which are closely spaced with respect to each other along an optic axis, and a liquid lens element (e.g., Cargille 850173 liquid) contained between two of the glass lens elements.

In practicing the present invention, an apochromatic lens system is obtained that is well-corrected for the monochromatic aberrations and for chromatic variations of the monochromatic aberrations, as well as for secondary and higher-order axial chromatic aberration, using optical materials that are particularly suitable for manufacturing lens systems on a mass-production scale.

DESCRIPTION OF THE DRAWING

FIG. 1 is a profile drawing of a first embodiment of a lens system according to the present invention.

FIG. 1A is an enlarged view of a peripheral portion of the lens system of FIG. 1.

FIG. 2 is a plot of aperture height versus transverse ray aberration at five different wavelengths for the lens system of FIG. 1.

FIG. 3 is a plot of change in back focal distance versus wavelength for the lens system of FIG. 1.

FIG. 4 is a combined plot of paraxial marginal ray height versus wavelength and root-mean-square (RMS) spot radius versus wavelength for the lens system of FIG. 1.

FIG. 5 is a combined plot of the polychromatic modulation transfer function for on-axis rays calculated at the wavelengths indicated in FIG. 2 for the lens system of FIG. 1, and of the polychromatic modulation transfer function for on-axis rays calculated at the same wavelengths for a diffraction-limited optical system having the same aperture diameter and focal ratio as the lens system of FIG. 1.

FIG. 6 is a profile drawing of a second embodiment of a lens system according to the present invention.

FIG. 6A is an enlarged view of a peripheral portion of the lens system of FIG. 6.

FIG. 7 is a plot of aperture height versus transverse ray aberration at five different wavelengths for the lens system of FIG. 6.

FIG. 8 is a plot of change in back focal distance versus wavelength for the lens system of FIG. 6.

FIG. 9 is a combined plot of paraxial marginal ray height versus wavelength and root-mean-square (RMS) spot radius versus wavelength for the lens system of FIG. 6.

FIG. 10 is a combined plot of the polychromatic modulation transfer function for on-axis rays calculated at the wavelengths indicated in FIG. 7 for the lens system of FIG. 6, and of the polychromatic modulation transfer function for on-axis rays calculated at the same wavelengths for a diffraction-limited optical system having the same aperture diameter and focal ratio as the lens system of FIG. 6.

FIG. 11 is a profile drawing of a third embodiment of a lens system according to the present invention.

FIG. 11A is an enlarged view of a peripheral portion of the lens system of FIG. 11.

FIG. 12 is a plot of aperture height versus transverse ray aberration at five different wavelengths for the lens system of FIG. 11.

FIG. 13 is a plot of change in back focal distance versus wavelength for the lens system of FIG. 11.

FIG. 14 is a combined plot of paraxial marginal ray height versus wavelength and root-mean-square (RMS) spot radius versus wavelength for the lens system of FIG. 11.

FIG. 15 is a combined plot of the polychromatic modulation transfer function for on-axis rays calculated at the wavelengths indicated in FIG. 12 for the lens system of FIG. 11, and of the polychromatic modulation transfer function for on-axis rays calculated at the same wavelengths for a diffraction-limited optical system having the same aperture diameter and focal ratio as the lens system of FIG. 11.

BEST MODE OF CARRYING OUT THE INVENTION

As illustrated in FIG. 1, a lens system according to the present invention comprises three coaxially positioned and closely spaced lens elements 10, 11, and 12, which are made of an optical glass that is selected for its low cost and ready availability. In particular, the optical glass of which the lens elements 10, 11 and 12 are made is chosen because of its suitability for use in mass-production manufacturing operations. An air gap 13 is provided between the lens elements 10 and 11, and an optical liquid is contained between the lens elements 11 and 12. The optical liquid constitutes a lens element 14, so that the lens system illustrated in FIG. 1 is a quadruplet (i.e., a four-element lens system).

The optical glass of the lens elements 10, 11 and 12 and the optical liquid of the lens element 14 are required to be "compatible" with each other in the sense that these two different materials (i.e., the optical glass and the optical liquid in combination with each other) enable color correction at three discrete wavelengths to be achieved. In general, with respect to a lens system, the term "color correction at three discrete wavelengths" means that paraxial marginal rays passing through the lens system are brought to a common focus at three discrete wavelengths. Compatibility of the optical materials is a necessary condition for achieving color correction at three discrete wavelengths, but not a sufficient condition. Unless compatible optical materials are used for the lens elements of the system, it would not be possible to obtain color correction at three wavelengths for the system. However, even if compatible optical materials are used, it would still not be possible to achieve color correction at three wavelengths for the system, unless a design form (i.e., optical prescription) for the system is found that brings paraxial marginal rays to a common focus at three wavelengths.

In the particular lens system illustrated in FIG. 1, the lens elements 10, 11 and 12 are made of K5 optical glass marketed by Schott Optical Glass Inc. of Duryea, Pa. The liquid lens element 14 consists of an immersion oil marketed by R. L. Cargille Laboratories of Cedar Grove, N.J., which is uniquely identified by its index of refraction of 1.850 calculated to three decimal places at the wavelength of the sodium D spectral line (i.e., 0.5893 micron), and by its Abbe number of 17.3 calculated to the first decimal place at the same wavelength. In accordance with the U.S. Mil Spec system, the immersion oil of which the liquid lens element 14 is made is uniquely identified as Cargille 850173 liquid.

The three glass lens elements 10, 11 and 12 are geometrically identical to each other, and have spherical curvatures. A technique is disclosed in co-pending U.S. patent application Ser. No. 260,106 for mounting the lens quadruplet of FIG. 1 so that the liquid lens element 14 can be contained between the glass lens elements 11 and 12. An enlarged view of a peripheral portion of the lens system of FIG. 1 is shown in FIG. 1A.

The design form (i.e., optical prescription) for the lens quadruplet of FIG. 1 is specified in tabular format for a 10-inch focal length and an f/10 focal ratio as follows:

TABLE I

| Surface No. | Radius (inches) | Thickness (inches) | $N_d$ | $V_d$ | Material |
|---|---|---|---|---|---|
| 1 | 15.1467 | 0.0600 | 1.52249 | 59.48 | K5 |
| 2 | −41.1198 | 0.0005 | | | Air |
| 3 | 15.1467 | 0.0600 | 1.52249 | 59.48 | K5 |
| 4 | −41.1198 | 0.0013 | 1.85044 | 17.35 | 850173 |
| 5 | 41.1198 | 0.0600 | 1.52249 | 59.48 | K5 |
| 6 | −15.1467 | 9.9153 | | | Air |
| 7 | (image plane) | | | | | where the surfaces of all the lens elements are spherical and are numbered consecutively from left to right along the optic axis in accordance with optical design convention. Thus, surfaces No. 1 and No. 2 are the left and right surfaces, respectively, of the lens element 10, and surfaces No. 3 and No. 4 are the left and right surfaces, respectively, of the lens element 11. Surface No. 4 is also the left surface of the liquid lens element 14 contained between the glass lens elements 11 and 12. Surface No. 5 is both the right surface of the liquid lens element 14 and the left surface of the glass lens element 12. Surface No. 6 is the right surface of the lens element 12.

The radius listed for each lens surface in Table I is the radius of curvature expressed in inches. In accordance with convention, the radius of curvature is positive if the center of curvature of the surface lies to the right of the surface, and negative if the center of curvature of the surface lies to the left of the surface. The thickness listed for each lens surface is the thickness expressed in inches of the lens element bounded on the left by the surface. The thickness of each lens element is measured along the optic axis. The diameter of each lens element is one inch, and the aperture stop for the system is located at surface No. 1.

The column heading $N_d$ in Table I refers to the refractive index of the lens element bounded on the left by the indicated surface at the wavelength of the sodium d spectral line (i.e., 0.58756 micron). The column heading $V_d$ refers to the Abbe number for the lens element bounded on the left by the indicated surface at the same wavelength. The material listed for each surface in Table I refers to the type of optical material used for the lens element bounded on the left by the indicated surface. Thus, the lens elements 10, 11 and 12 are made of Schott K5 glass, and the lens element 14 is made of Cargille 850173 liquid. It is noted that the code designation "850173" for the Cargille liquid used for the liquid lens element 14 uniquely identifies that particular liquid in terms of its refractive index (to within a round-off error in the third decimal place) at the wavelength of the sodium D line (i.e., 0.5893 micron), whereas the refractive index values listed in the column headed $N_d$ in Table I are the values at the wavelength of the sodium d line (i.e., 0.58756 micron).

The refractive index of each optical material varies with wavelength. It is instructive to evaluate the performance of the lens system of FIG. 1 at a number of different wavelengths in order to determine the usefulness of the system for particular applications. The values of refractive index for the optical materials of the lens system of FIG. 1 at five specified wavelengths are as follows:

TABLE II

| Material | $N_1$ | $N_2$ | $N_3$ | $N_4$ | $N_5$ |
|---|---|---|---|---|---|
| K5 | 1.52249 | 1.52860 | 1.51981 | 1.52910 | 1.51829 |
| 850173 | 1.85044 | 1.88456 | 1.83553 | 1.88731 | 1.82722 | where $N_1$ is the index of refraction at the base wavelength of 0.58756 micron, and $N_2$, $N_3$, $N_4$ and $N_5$ are the indices of refraction at specified wavelengths on either side of the base wavelength. Thus, $N_2$ is the refractive index at 0.48613 micron, $N_3$ is the refractive index at 0.65627 micron, $N_4$ is the refractive index at 0.48000 micron, and $N_5$ is the refractive index at 0.70652 micron.

A graphical indication of performance of a lens system is provided by a plot of aperture height versus transverse ray aberration. Plots of aperture height versus transverse ray aberration are given in FIG. 2 for each of the five wavelengths specified in Table II. Over the wavelength range from 0.480 micron to 0.656 micron, the separation between the curves for aperture height versus transverse ray aberration for discrete wavelengths is so small that the curves cannot be distinguished from one another in the scale of FIG. 2. Thus, in FIG. 2, the curves for the wavelengths 0.48000 micron, 0.48613 micron, 0.58756 micron and 0.65627 micron are represented by a single curve (i.e., the solid curve). The curve for the wavelength 0.70652 can be discerned as a separate curve (i.e., the broken curve) in the scale of FIG. 2. From the shape of the curves shown in FIG. 2, it is apparent that performance of the lens system of FIG. 1 is limited by third-order spherical aberration. The closeness of the curves shown in FIG. 2 to each other indicates that the shift in focus of the lens system with respect to wavelength, and the chromatic variation of spherical aberration for the lens system, are substantially negligible.

A plot of change in back focal distance versus wavelength is shown in FIG. 3 for the lens system of FIG. 1. The change in back focal distance as a function of wavelength for a lens system is a measure of the extent of axial chromatic aberration of the system. The three crossings of the horizontal axis by the curve in FIG. 3 indicate that the lens system of FIG. 1 is color-corrected at three wavelengths (i.e., apochromatized).

Rayleigh's criterion for determining the amount of focal shift that can be tolerated for a wavefront passing through a lens system is that not more than one-quarter wavelength of optical path difference should occur over the wavefront relative to a reference sphere centered at a selected image point for the lens system. For a discussion of Rayleigh's criterion, see Warren Smith's text entitled *Modern Optical Engineering*, McGraw-Hill Book Company, Inc., 1966, page 297. The closeness of the curve in FIG. 3 to the horizontal axis throughout the wavelength range extending from approximately 0.48 micron to approximately 0.72 micron indicates that the lens system of FIG. 1 can be used in that wavelength range without exceeding a depth-of-focus tolerance of one-quarter wavelength in accordance with Rayleigh's criterion.

In FIG. 4, paraxial marginal ray height and root-mean-square (RMS) spot radius are plotted as functions of wavelength for the apochromatic lens system of FIG. 1. The variation of paraxial marginal ray height as a function of wavelength on the image plane of a lens system provides an indication of the extent to which the lens system is corrected for axial chromatic aberration. The curve for paraxial marginal ray height in FIG. 4 crosses the horizontal axis at three points, which indicate the three wavelengths at which the lens system of FIG. 1 brings paraxial marginal rays to a common focus (i.e., the three wavelengths at which color correction is achieved).

The curve for paraxial marginal ray height versus wavelength in FIG. 4 has the same shape as the curve for change in back focal distance versus wavelength in FIG. 3. The height of the curves in FIGS. 3 and 4 at any given wavelength is a measure of the magnitude of secondary and higher-order chromatic aberration of the lens system of FIG. 1 at that given wavelength. The fact that the curves in FIGS. 3 and 4 are very close to the horizontal axis throughout the spectral region from approximately 0.48 micron to approximately 0.72 micron indicates that the lens system of FIG. 1, as well as being apochromatic, has practically insignificant secondary and higher-order chromatic aberration throughout the visible spectrum.

It is apparent from the curve for RMS spot radius versus wavelength in FIG. 4 that the RMS spot radius of the lens system of FIG. 1 is nearly constant over the spectral range from approximately 0.48 micron to approximately 0.80 micron. Furthermore, the RMS spot radius for the lens system of FIG. 1 is equal to or less than the radius of the Airy disc for the lens system over a spectral range from approximately 0.48 micron to beyond 0.80 micron. Thus, at a focal length of 10 inches and a focal ratio of f/10, the lens system of FIG. 1 is diffraction-limited.

Because of the electromagnetic nature of optical radiation, the performance of an optical system is affected not only by geometrical aberrations (i.e., the monochromatic aberrations, chromatic aberration, and chromatic variations of the monochromatic aberrations) but also by diffraction. In a lens system, diffraction reduces the contrast of a sinusoidal input signal by an amount that varies with the spatial frequency of the input signal. The performance of a system is generally indicated by the ratio of the amplitude of the output to the amplitude of the input, which is conventionally represented by a plot of response versus frequency. In analyzing the performance of a lens system, the "polychromatic modulation transfer function" is defined as the ratio of the modulation of the input signal to the modulation of the output signal. This ratio, plotted as a function of the spatial frequency (measured in lines per millimeter) of the input signal, indicates the performance of the lens system.

In FIG. 5, the solid-line curve is a plot of the polychromatic modulation transfer function for on-axis rays calculated at the five wavelengths listed in Table II for the lens system of FIG. 1. The broken-line curve in FIG. 5 is a plot of the polychromatic modulation transfer function for on-axis rays calculated at the same five wavelengths listed in Table II for a diffraction-limited optical system of same aperture diameter and focal ratio. The closeness of the two curves to each other in FIG. 5 indicates that the lens system of FIG. 1 is substantially diffraction-limited over the spectral range of Table II.

A second embodiment of a lens system according to the present invention is illustrated in FIG. 6. The lens system of FIG. 6 comprises three closely spaced glass lens elements 20, 21 and 22 disposed concentrically along an optic axis in an appropriate mounting with an air gap 23 between the glass lens elements 20 and 21, and with an optical liquid contained between the glass lens elements 21 and 22. The glass lens elements 20, 21 and 22 are all made of the same optical material, and are geometrically identical to each other. The optical liquid constitutes a liquid lens element 24. Thus, the lens system of FIG. 6 is a quadruplet comprising the three glass lens elements 20, 21, and 22 and the liquid lens element 24. A peripheral portion of the lens system of FIG. 6 is shown in enlarged view in FIG. 6A.

The design form for the lens quadruplet of FIG. 6 is specified in tabular format for a 10-inch focal length and a f/10 focal ration as follows:

TABLE III

| Surface No. | Radius (inches) | Thickness (inches) | $N_d$ | $V_d$ | Material |
|---|---|---|---|---|---|
| 1 | 19.4624 | 0.0600 | 1.62280 | 56.90 | SK10 |
| 2 | −38.5385 | 0.0005 | | | Air |
| 3 | 19.4624 | 0.0600 | 1.62280 | 56.90 | SK10 |
| 4 | −38.5385 | 0.0013 | 1.85044 | 17.35 | 850173 |
| 5 | 38.5385 | 0.0600 | 1.62280 | 56.90 | SK10 |
| 6 | −19.4624 | 9.9090 | | | Air |
| 7 | (image plane) | | | | | where the surfaces of all the lens elements are spherical and are numbered consecutively from left to right along the optic axis, and where the "radius", "thickness", "Nd", "Vd" and "material" for each of the lens surfaces are listed in accordance with the convention explained above in connection with Table I. The diameter of each lens element is one inch, and the aperture stop is located at surface No. 1.

The glass lens elements 20, 21 and 22 of the lens system of FIG. 6 are made of Schott SK10 glass, which is a relatively inexpensive and readily available optical glass. The liquid lens element 24 is made of Cargille 850173 liquid. The values of refractive index for Schott SK10 glass and Cargille 850173 liquid at the same five wavelengths that were used for evaluating the performance of the lens system of FIG. 1 are as follows:

TABLE IV

| Material | $N_1$ | $N_2$ | $N_3$ | $N_4$ | $N_5$ |
|---|---|---|---|---|---|
| SK10 | 1.62280 | 1.63043 | 1.61949 | 1.63106 | 1.61761 |
| 850173 | 1.85044 | 1.88456 | 1.83553 | 1.88731 | 1.82722 | where $N_1$ is the refractive index at the base wavelength of 0.58756 micron, and $N_2$, $N_3$, $N_4$ and $N_5$ are the refractive indices at 0.48613 micron, 0.65627 micron, 0.48000 micron and 0.70652 micron, respectively.

In FIG. 7, plots of aperture height versus transverse ray aberration are given for the five wavelengths indicated in Table IV. Over the wavelength range from 0.480 micron to 0.656 micron, the separation between the curves for aperture height versus transverse ray aberration for discrete wavelengths is so small that the curves cannot be distinguished from one another in the scale of FIG. 7. Thus, in FIG. 7, the curves for the wavelengths 0.48000 micron, 0.48613 micron, 0.58756 micron and 0.65627 micron are represented by a single curve (i.e., the solid curve). The curve for the wavelength 0.70652 can be discerned (but just barely) as a separate curve (i.e., the broken curve) the scale of in FIG. 7. From the shape of the curves shown in FIG. 7, it is apparent that performance of the lens system of FIG. 6 is limited by third-order spherical aberration. The closeness of the curves shown in FIG. 7 to each other indicates that the shift in focus of the lens system with respect to wavelength, and the chromatic variation of spherical aberration for the lens system, are substantically negligible.

FIG. 8 is a plot of change in back focal distance versus wavelength for the lens system shown in FIG. 6. As indicated by the three crossings of the horizontal axis by the curve in FIG. 8, the lens system of FIG. 6 is apochromatic and has practically insignificant secondary and higher-order chromatic aberration throughout the wavelength range from 0.48 micron to 0.80 micron. The lens system of FIG. 6 can be used without exceeding Rayleigh's depth-of-focus tolerance of one-quarter wavelength over the spectral range from 0.48 to 0.72 micron.

In FIG. 9, paraxial marginal ray height and RMS spot radius are plotted as functions of wavelength at the image plane for the apochromatic lens system of FIG. 6. The curve in FIG. 9 for paraxial marginal ray height versus wavelength has the same shape as the curve in FIG. 8 for change in back focal distance versus wavelength. The fact that the curve for paraxial marginal ray height versus wavelength hugs the horizontal axis throughout the wavelength range from 0.48 micron to 0.72 micron indicates that geometrical blur for the lens system of FIG. 6 is practically insignificant over that wavelength range.

The RMS spot radius for the lens system of FIG. 6 is seen from the curve in FIG. 9 to be substantially constant over the wavelength range from 0.48 micron to 0.80 micron. The RMS spot radius is approximately twice the radius of the Airy disc for the lens system of FIG. 6 at a wavelength of 0.48 micron, and is approximately equal to the radius of the Airy disc at a wavelength of 0.80 micron. Thus, the lens system of FIG. 6 is diffraction-limited at wavelengths of 0.80 micron and longer.

In FIG. 10, the solid-line curve is a plot of the polychromatic modulation transfer function for on-axis rays calculated at the five wavelengths listed in Table IV for the lens system of FIG. 6. The broken-line curve in FIG. 10 is a plot of the polychromatic modulation transfer function for on-axis rays calculated at the same five wavelengths listed in Table IV for a diffraction-limited optical system of the same aperture diameter and focal ratio. The closeness of the two curves to each other in FIG. 10 indicates that the lens system of FIG. 6 is substantially diffraction-limited over the spectral range of Table IV.

A third embodiment of a lens system according to the present invention is illustrated in FIG. 11. The lens system of FIG. 11 comprises three closely spaced glass lens elements 30, 31 and 32 disposed concentrically along an optic axis in an appropriate mounting with an air gap 33 between the lens elements 30 and 31, and with an optical liquid contained between the glass lens elements 31 and 32. The glass lens elements 30, 31 and 32 are all made of the same optical material, and are geometrically identical to each other. The optical liquid constitutes a liquid lens element 34. The lens system of FIG. 11 is thus a quadruplet comprising the three glass lens elements 30, 31 and 32 and the liquid lens element 34. A peripheral portion of the lens system of FIG. 11 is shown in enlarged view in FIG. 11A.

The design form for the lens quadruplet of FIG. 11 is specified in tabular format for a 10-inch focal length and an f/10 focal ratio as follows:

TABLE V

| Surface No. | Radius (inches) | Thickness (inches) | $N_d$ | $V_d$ | Material |
|---|---|---|---|---|---|
| 1 | 17.2986 | 0.0600 | 1.57250 | 57.55 | BAK1 |
| 2 | −39.4096 | 0.0005 | | | Air |
| 3 | 17.2986 | 0.0600 | 1.57250 | 57.55 | BAK1 |
| 4 | −39.4096 | 0.0013 | 1.85044 | 17.35 | 850173 |
| 5 | 39.4096 | 0.0600 | 1.57250 | 57.55 | BAK1 |
| 6 | −17.2986 | 9.9709 | | | Air |
| 7 | (image plane) | | | | | where the surfaces of all the lens elements are spherical and are numbered consecutively from left to right along the optic axis, and where the "radius", "thickness", "$N_d$", "$V_d$ and "material" for each of the lens surfaces are listed in accordance with the convention explained above in connection with Table I. The diameter of each lens element is one inch, and the aperture stop is located at surface No. 1.

The glass lens element 30, 31 and 32 of the lens system of FIG. 11 are made of Schott BAK1 glass, which is also a relatively inexpensive and readily available optical glass. The liquid lens element 34 is made of Cargille 850173 liquid. The values of refractive index for Schott BAK1 glass and Cargille 850173 liquid at the same five wavelengths that were used for evaluating the performance of the lens systems of FIGS. 1 and 6 are as follows:

TABLE VI

| Material | $N_1$ | $N_2$ | $N_3$ | $N_4$ | $N_5$ |
|---|---|---|---|---|---|
| BAK1 | 1.57250 | 1.57943 | 1.56949 | 1.58000 | 1.56778 |
| 850173 | 1.85044 | 1.88456 | 1.83553 | 1.88731 | 1.82722 | where $N_1$ is the refractive index at the base wavelength of 0.58756 micron, and $N_2$, $N_3$, $N_4$ and $N_5$ are the refractive indices at 0.48613 micron, 0.65627 micron, 0.48000 micron and 0.70652 micron, respectively.

In FIG. 12, plots of aperture height versus traverse ray aberration are given for the five wavelengths indicated in Table VI. Over the wavelength range from 0.480 micron to 0.706 micron, the separation between the curves for aperture height versus transverse ray aberration for discrete wavelengths is so small that the curves cannot actually be distinguished from one another in the scale of FIG. 12. For purposes of illustration, the curves for the wavelengths 0.48000 micron, 0.48613 micron, 0.58756 micron and 0.65627 micron are represented by a solid curve, and the curve for the wavelength 0.70652 is represented by a broken curve in contact with (and without separation from) the solid curve in FIG. 12. From the shape of the curves shown in FIG. 12, it is apparent that performance of the lens system of FIG. 11 is limited by third-order spherical aberration. The closeness of the curves shown in FIG. 12 to each other indicates that the shift in focus of the lens system with respect to wavelength, and the chromatic variation of spherical aberration for the lens system, are substantially negligible.

FIG. 13 is a plot of change in back focal distance versus wavelength for the lens system shown in FIG. 11. As indicated by the three crossings of the horizontal axis by the curve in FIG. 13, the lens system of FIG. 11 is apochromatic and has practically insignificant secondary and higher-order chromatic aberration throughout the wavelength range from 0.48 micron to 0.80 micron. The lens system of FIG. 13 can be used without exceeding Rayleigh's depth-of-focus tolerance of one-quarter wavelength over the spectral range from 0.48 to 0.72 micron.

In FIG. 14, paraxial marginal ray height and RMS spot radius are plotted as functions of wavelength at the image plane for the apochromatic lens system of FIG. 11. The curve in FIG. 14 for paraxial marginal ray height versus wavelength has the same shape as the curve in FIG. 13 for change in back focal distance versus wavelength, and indicates that geometrical blur for the lens system of FIG. 11 is practically insignificant over the entire visible spectrum. The RMS spot radius for the lens system of FIG. 11 is substantially constant over the wavelength range from 0.48 micron to 0.80 micron. The RMS spot radius is approximately twice the radius of the Airy disc for the lens system of FIG. 11 at a wavelength of 0.48 micron, and is approximately equal to the radius of the Airy disc at a wavelength of 0.80 micron. Thus, the lens system of FIG. 11 is diffraction-limited at wavelengths of 0.80 micron and longer.

In FIG. 15, the solid-line curve is a plot of the polychromatic modulation transfer function for on-axis rays calculated at the five wavelengths listed in Table VI for the lens system of FIG. 11. The broken-line curve in FIG. 15 is a plot of the polychromatic modulation transfer function for on-axis rays calculated at the same five wavelengths listed in Table VI for a diffraction-limited optical system of the same aperture diameter and focal ratio. The closeness of the two curves to each other in FIG. 15 indicates that the lens system of FIG. 11 is substantially diffraction-limited over the spectral range of Table VI.

The present invention has been described above in terms of particular embodiments. However, other embodiments within the scope of the invention would become apparent to practitioners skilled in the art of optical design upon perusal of the foregoing specification and accompanying drawing. Accordingly, the invention is defined more generally by the following claims and their equivalents.

I claim:

1. An apochromatic lens system comprising three glass lens elements and a liquid lens element disposed coaxially along an optic axis, said liquid lens element being contained between two of said glass lens elements, said three glass lens elements being made of substantially the same kind of optical glass and being of substantially the same geometrical configuration, said three glass lens elements and said liquid lens element coacting with each other to focus optical radiation passing through said lens system onto a focal surface with a change in focus of less than one-quarter wavelength within a wavelength range from 0.48 micron to 0.72 micron.

2. The lens system of claim 1 wherein said glass lens elements are made from an optical glass selected from among K5 glass, SK10 glass and BAK1 glass.

3. The lens system of claim 2 wherein said liquid lens element is made of an optical liquid, which has an index of refraction of approximately 1.85044 at a wavelength of 0.58756 micron and an Abbe number of approximately 17.35.

4. The lens system of claim 1 wherein said three glass lens elements and said liquid lens element are configured and positioned along said optic axis substantially according to an optical prescription as follows:

| Surface No. | Radius (inches) | Thickness (inches) | $N_d$ | $V_d$ | Material |
|---|---|---|---|---|---|
| 1 | 15.1467 | 0.0600 | 1.52249 | 59.48 | K5 |
| 2 | −41.1198 | 0.0005 | | | Air |
| 3 | 15.1467 | 0.0600 | 1.52249 | 59.48 | K5 |
| 4 | −41.1198 | 0.0013 | 1.85044 | 17.35 | 850173 |
| 5 | 41.1198 | 0.0600 | 1.52249 | 59.48 | K5 |
| 6 | −15.1467 | 9.9153 | | | Air |
| 7 | (image plane) | | | | | where $N_d$ is the index of refraction at the wavelength of the sodium d spectral line and $V_d$ is the Abbe number at the same wavelength.

5. The lens system of claim 1 wherein said three glass lens elements and said liquid lens element are configured and positioned along said optic axis substantially according to an optical prescription as follows:

| Surface No. | Radius (inches) | Thickness (inches) | $N_d$ | $V_d$ | Material |
|---|---|---|---|---|---|
| 1 | 19.4624 | 0.0600 | 1.62280 | 56.90 | SK10 |
| 2 | −38.5385 | 0.0005 | | | Air |
| 3 | 19.4624 | 0.0600 | 1.62280 | 56.90 | SK10 |
| 4 | −38.5385 | 0.0013 | 1.85044 | 17.35 | 850173 |
| 5 | 38.5385 | 0.0600 | 1.62280 | 56.90 | SK10 |
| 6 | −19.4624 | 9.9090 | | | Air |
| 7 | (image plane) | | | | | where $N_d$ is the index of refraction at the wavelength of the sodium d spectral line and $V_d$ is the Abbe number at the same wavelength.

6. The lens system of claim 1 wherein said three glass lens elements and said liquid lens element are configured and positioned along said optic axis substantially according to an optical prescription as follows:

| Surface No. | Radius (inches) | Thickness (inches) | $N_d$ | $V_d$ | Material |
|---|---|---|---|---|---|
| 1 | 17.2986 | 0.0600 | 1.57250 | 57.55 | BAK1 |
| 2 | −39.4096 | 0.0005 | | | Air |
| 3 | 17.2986 | 0.0600 | 1.57250 | 57.55 | BAK1 |
| 4 | −39.4096 | 0.0013 | 1.85044 | 17.35 | 850173 |
| 5 | 39.4096 | 0.0600 | 1.57250 | 57.55 | BAK1 |
| 6 | −17.2986 | 9.9709 | | | Air |
| 7 | (image plane) | | | | | where $N_d$ is the index of refraction at the wavelength of the sodium d spectral line and $V_d$ is the Abbe number at the same wavelength.

* * * * *